United States Patent [19]

Michalko

[11] 3,972,829

[45] Aug. 3, 1976

[54] METHOD OF DEPOSITING A CATALYTICALLY ACTIVE METALLIC COMPONENT ON A CARRIER MATERIAL

[75] Inventor: Edward Michalko, Chicago, Ill.

[73] Assignee: Universal Oil Products Company, Des Plaines, Ill.

[22] Filed: Nov. 7, 1974

[21] Appl. No.: 521,978

[52] U.S. Cl. .......................... 252/430; 252/466 PT
[51] Int. Cl.² ................................... B01J 31/02
[58] Field of Search ....... 252/466 PT, 466 B, 466 J, 252/430

[56] References Cited
UNITED STATES PATENTS 3,367,888   2/1968   Hoekstra ............................ 252/456
3,503,715   3/1970   Haensel .......................... 252/466 PT Primary Examiner—Patrick P. Garvin
Assistant Examiner—John P. Sheehan
Attorney, Agent, or Firm—James R. Hoatson, Jr.; Raymond H. Nelson; William H. Page, II

[57] ABSTRACT

A method is disclosed for effecting a uniform distribution of catalytically active metallic component over substantially all of the available surface area of a carrier material in a crystallite size of less than about 25 Angstroms. The innovative feature is in the use of a sulfur-containing organic acid as a complexing agent for the catalytically active metallic component in an impregnating solution adjusted to a pH of from about 5 to about 7.

15 Claims, No Drawings

METHOD OF DEPOSITING A CATALYTICALLY ACTIVE METALLIC COMPONENT ON A CARRIER MATERIAL

Various high surface area refractory materials have been utilized as a support or carrier material for catalytically active metallic components. The high surface area refractory materials suitable for use as a catalyst support or carrier material are highly porous materials, and the high surface area results primarily from the extensive internal pore structure. Surface areas of from about 25 to about 400 square meters per gram or more are not uncommon, and the optimum in activity, selectivity and/or stability is in most cases realized with the greatest distribution of the catalytically active metal sites over the total available surface area of the carrier material, and as said metal sites approach mono-atomic dimension.

It is the practice to impregnate a catalytically active metallic component on a carrier material from an aqueous solution of a suitable precursor compound of said component, the impregnated carrier material being subsequently dried and calcined to form the desired catalytically active metallic component deposited thereon. To achieve a substantially uniform distribution of catalytically active metal sites over the total available surface area, it is known to acidify the impregnating solution, for example, by the addition of hydrochloric acid thereto. However, particularly with respect to the Group VIII metals, the crystallite size of the metal sites is well in excess of 25 Angstroms, typically about 135 Angstroms.

It has been observed that a crystallite size of less than 25 Angstroms results when a sulfur-containing organic acid is included in the impregnating solution. However, as taught in U.S. Patent No. 3,367,888 the metal component is deposited primarily on the outer surface representing 20–30% of the total available surface area of the carrier material, and there is substantially no penetration thereof.

It has now been found that the impregnating solution comprising a sulfur-containing organic acid, further modified in accordance with this invention, can be utilized to effect a substantially uniform distribution of the catalytically active metal sites on a carrier material in a crystallite size of less than about 25 Angstroms.

In one of its broad aspects, the present invention embodies a method of distributing a catalytically active metallic component over the available surface area of a porous carrier material in a crystallite size of less than about 25 Angstroms which comprises commingling said carrier material with a common solution of a precursor compound of said catalytically active material component and a sulfur-containing organic acid, said solution having a pH of from about 5 to about 7 and thereafter drying and calcining the resulting composite.

One of the more specific embodiments of this invention comprises commingling an alumina carrier material with a common solution of a precursor compound of a Group VIII metal and a sulfur-containing organic acid, said solution having a pH of from about 5 to about 7, and thereafter drying and calcining the resulting composite.

A still more specific embodiment of this invention comprises commingling a gamma-alumina carrier material with a common solution of nickel chloride and carboxymethylmercaptosuccinic acid, said solution having a pH of from about 5 to about 7, and thereafter drying and calcining the resulting composite in a reducing atmosphere to form a catalytically active nickel component uniformly distributed over at least about 70% of the total surface area in a crystallite size of less than about 25 Angstroms.

Other objects and embodiments of this invention will become apparent in the following detailed specification.

The porous carrier materials suitable for use herein include the refractory inorganic oxides commonly employed as a support or carrier material for catalytically active metallic components. The refractory inorganic oxide may be a naturally occurring material, for example clays and silicates such as fuller's earth, Attapulgus clay, feldspar, halloysite, montmorillonite, kaolin, and diatomaceous earth, frequently referred to as siliceous earth, diatomaceous silicate, kieselguhr, and the like, and the naturally occurring materials may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia, and the like are especially suitable. Alumina is a preferred refractory inorganic oxide, and the alumina may be any of the various hydrous aluminum oxides or alumina gels including alpha-alumina monohydrate (boehmite), alpha-alumina trihydrate (gibbsite), beta-alumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 100 to about 500 square meters per gram, especially gamma-alumina and eta-alumina resulting from the thermal treatment of boehmite alumina and bayerite alumina respectively, generally at a temperature of from about 400° to about 850° C. The alumina may be employed in any suitable shape or form including spheres, pills, extrudates, granules, cakes, briquettes, rings, etc., and particularly low density spheres such as are continuously manufactured by the oil-drop method described in detail in U.S. Pat. No. 2,620,314.

The catalytically active metallic components herein contemplated may be any one of several catalytically active metals or metal oxides known to the art. Said catalytically active metals typically comprise a metal of Groups IVA, IB, VIB, VIIB, and VIII of the Periodic Table. The catalytically active metallic components herein contemplated thus include copper, silver, gold, molybdenum, chromia, tungsten, manganese, technecium, rhenium, germanium, tin, lead, iron, nickel, cobalt, platinum, palladium, rhodium, ruthenium, osmium, iridium, etc., alone or in combination, and in the oxidized or reduced state. Of particular interest are those metals of Group VIII, that is, iron, nickel, cobalt, platinum, palladium, rhodium, ruthenium, osmium and iridium.

Precursor compounds of said catalytically active metallic components suitable for use in an impregnating solution are generally those compounds convertible to said components by thermal decomposition means. Precursor compounds in general use include the nitrates, sulfates, and especially the halides of a desired metal component, for example, ferric chloride, ferric nitrate, ferric sulfate, nickel chloride, nickel nitrate, nickel sulfate, cobalt chloride, cobalt nitrate, cobalt sulfate, platinum dichloride, platinum tetrachloride, platinum sulfate, palladium chloride, palladium sulfate, rhodium trichloride, rhodium sulfate, ruthenium tetrachloride, osmium trichloride, iridium dichloride, iridium tetrachloride, etc. Other precursor compounds commonly employed include such as chloroplatinic acid, chloropalladic acid, ammonium chloroplatinate, dinitrodiaminoplatinum, and the like.

In any case, pursuant to the present invention, the selected precursor compound is prepared in a common solution with a sulfur-containing organic acid which may be a thio acid or a mercaptocarboxylic acid. Suitable sulfur-containing organic acids thus include carbothiolic acids, carbothionic acids and carbodithioic acids as well as mercaptocarboxylic acids, for example thiomalic acid, thioglycolic acid methanethiolic acid, ethanethiolic acid, propanethiolic acid, methanethionic acid, ethanethionic acid, propanethionic acid, ethanedithioic acid, propanedithioic acid, and the like. The sulfur-containing organic acid is preferably a mercaptocarboxylic acid, for example, mercaptoacetic acid, 3-mercaptopropionic acid, 2-mercaptosuccinic acid, carboxymethylmercaptosuccinic acid, and the like. For optimum results, the sulfur-containing organic acids should be dissolved in the impregnating solution in at least an equimolar amount with the catalytic component, or precursor compound thereof, although a larger molar excess up to about 10:1 or more may be employed.

It is an essential feature of this invention that the pH of the described common solution of a precursor compound of a catalytically active metallic component and a sulfur-containing organic acid be adjusted in the range of from about 5 to about 7. Typically, this will require the addition of a basic reagent, suitably an aqueous ammonium hydroxide solution. It has been previously been noted that a more acid solution, while effecting a desired crystallite size, will also effect a deposition of the catalytic component on the outer surface of the support or carrier material representing less than about 30% of the total available surface area thereof.

The carrier material, preferably gamma-alumina or eta-alumina, is commingled with the described common solution and impregnated therewith utilizing techniques known to the art. Thus, the carrier material is suspended, soaked, dipped one or more times, or otherwise immersed in the solution. Preferably, a given volume of a particulate carrier material is immersed in a substantially equal volume of impregnating solution, and the carrier material maintained in contact with the solution for a brief period at ambient temperature. The solution is thereafter evaporated to dryness in contact with the carrier material leaving the catalytic component, or a precursor thereof, deposited on the surface of said carrier material. For example, a volume of 1/8" alumina spheres is immersed in a substantially equal volume of a common aqueous solution of chloroplatinic acid and thiomalic acid in a steam-jacketed rotary dryer and tumbled therein for a brief period at room temperature. Steam is thereafter applied to the dryer jacket to expedite evaporation of the solution and recovery of substantially dry impregnated particles. The resulting composite is subsequently heat treated, generally at a temperature of from about 315° to about 925° C., for a period of from about ½ to about 2 hours or more in an oxidizing atmosphere, and, preferably further heat treated in a reducing atmosphere such as hydrogen at said conditions of time and temperature. Sulfidation, by treating the catalyst composite in contact with hydrogen sulfide at ambient temperature, has in some cases been shown to be of advantage.

The following examples are presented in illustration of the method of this invention and are not intended as an undue limitation on the generally broad scope of the invention as set out in the appended claims.

EXAMPLE I

In the preparation of a catalyst in accordance with one preferred embodiment of this invention, 200 cubic centimeters (100 grams) of 1/16" gamma-alumina spheres were immersed in a 180 cubic centimeter impregnating solution contained in a steam-jacketed rotary dryer. The solution was prepared by dissolving 3.54 grams of carboxymethylmercaptosuccinic acid in 60 cubic centimeters of water, adjusting the pH to 7 with aqueous ammonium hydroxide, and adding thereto 10 cubic centimeters of an aqueous nickel chloride solution containing 100 milligrams of nickel per cubic centimeter. The resulting solution, with a pH of 5.9, was subsequently diluted to 180 milliliters with water. The alumina spheres were tumbled in the solution at ambient temperature for about ½ hour after which steam was applied to the dryer jacket and the solution evaporated to dryness in contact with the tumbling spheres. The impregnated spheres were then calcined in air for 1 hour at 520° C. and then reduced in hydrogen for 1 hour at 565° C. The catalyst contained 1 wt. % nickel. Sample spheres were split to show about an 80% penetration of the nickel component, and X-ray analyses indicated that the nickel crystallite size was less than 25 Angstroms.

EXAMPLE II

In this example, the sulfur-containing organic acid was omitted, and the impregnating solution was acidified with hydrochloric acid to achieve an even distribution of the nickel component on the carrier material as is commonly practiced. Thus, 200 cubic centimeters (100 grams) of 1/16" gamma-alumina spheres were immersed in about a 190 cubic centimeter impregnating solution contained in a steam-jacketed rotary dryer. The solution was prepared by dissolving 10 cubic centimeters of an aqueous nickel chloride solution (100 milligrams of nickel per cubic centimeter) and 4.8 cubic centimeters of concentrated hydrochloric acid in 180 milliliters of water. The impregnating solution had a pH of about 0.7. The alumina spheres were tumbled in the solution at ambient temperature for about ½ hour after which steam was applied to the dryer jacket and the solution evaporated to dryness in contact with the tumbling spheres. The impregnated spheres were than calcined in air for about 1 hour at 525° C., and then reduced in hydrogen for 1 hour at 565° C. The catalyst product contained 1 wt. % nickel. X-ray analyses indicated the nickel crystallite size to be about 135 Angstroms.

EXAMPLE III

In this example, the sulfur-containing organic acid was omitted from the preparation, and the pH of the impregnating solution was adjusted to about 10 with an aqueous ammoniacal solution. Thus, 100 cubic centimeters (50 grams) of 1/16" gamma-alumina spheres were immersed in about a 107 cubic centimeter impregnating solution contained in a steam-jacketed rotary dryer. The solution was prepared by dissolving 5 cubic centimeters of an aqueous nickel chloride solution (100 milligrams of nickel per cubic centimeter) and 12 cubic centimeters of a 15% aqueous ammonia (to give 6 m $NH_3$/m Ni) solution in 90 cubic centimeters of water. The impregnating solution had a pH of about 10.3. The alumina spheres were tumbled in the solution at ambient temperature for about ½ hour after which steam was applied to the dryer jacket and the solution evaporated to dryness in contact with the tumbling spheres. The impregnated spheres were then calcined in air for about 1 hour. The catalyst product contained 1 wt. % nickel. Sample spheres were split and microscopic examination showed about an 80% penetration of the nickel component. However, X-ray analyses indicated the nickel crystallite size to be 195 Angstroms.

The catalyst prepared in accordance with the present method may comprise any of the several catalytically active metallic materials in either the oxidized or reduced state. Thus, catalyst prepared in accordance with the method of this invention may be utilized to effect a variety of reactions of organic compounds. These reactions include condensation reactions wherein two like or unlike molecules are combined to form a larger molecule usually with the elimination of water or hydrogen chloride; decomposition reactions wherein a molecule is broken down into a simpler constituent, or double decomposition wherein two molecules exchange one or more of their constituents; rearrangement reactions such as, for example, isomerization; and disproportionation reactions wherein a radical is transferred from one molecule to another. The catalysts are useful to effect hydrogenation reactions including hydrogenation of unsaturated aliphatic hydrocarbons such as monoolefins, diolefins, etc., to form the corresponding saturated hydrocarbons; hydrogenation of unsaturated cyclic hydrocarbons, unsaturated alcohols, ketones, acids, etc.; and also oxidation reactions, e.g., oxidation of olefins to form the corresponding oxides, such as the oxidation of ethylene to form ethylene oxide, etc., oxidation of alcohols, ketones, etc. The catalysts prepared in accordance with the method of this invention are particularly useful in effecting the conversion of hydrocarbons such as, for example, polymerization of olefins, particularly ethylene, propylene, 1-butene, 2-butene, isobutene and higher boiling olefins; alkylation of isoparaffins with olefins or other alkylating agents including, for example, alkyl halides, etc., and particularly the alkylation of isobutane, isopentane, and/or isohexane with ethylene, propylene, 1-butene, 2-butene, isobutene, etc., or mixtures thereof; alkylation of aromatics with olefins or other alkylating agents, and particularly the alkylation of benzene, toluene, etc., with propylene, butylene, amylene, and particularly higher boiling olefins, including nonenes, decenes, 1-decenes, dodecenes, etc., or mixtures thereof; isomerization of paraffins and particularly of n-butane, n-pentane, n-hexane, n-heptane, etc., or mixtures thereof, including isomerization of less highly branched chain saturated hydrocarbons to more highly branched chain saturated hydrocarbons such as the isomerization of 2- or 3-methylpentane to 2,3- and 2,2-dimethylbutane; isomerization of naphthenes, for example, the isomerization of methylcyclopentane to cyclohexane, isomerization of dimethylcyclopentane to methylcyclohexane, etc.; hydrogen transfer reactions; alkyl transfer reactions; transalkylation reactions; reforming of gasolines or naphtha to improve the antiknock characteristics thereof; cracking of oil heavier than gasoline into lower boiling products, particularly gasoline, also including cracking under hydrogen pressures; and also other reactions of hydrocarbons and organic compounds.

I claim as my invention:

1. A method of distributing a catalytically active metallic component over the available surface area of a porous carrier material in a crystallite size of less than about 25 Angstroms which comprises commingling said carrier material with a common solution of a precursor compound of said catalytically active metallic component and an organic thio acid or a mercaptocarboxylic acid in a mole ratio of from about 1:1 to about 10:1, adjusting the pH of said solution to between about 5 and about 7 by addition of a basic reagent and impregnating said porous carrier material with the solution of adjusted pH, and thereafter drying and calcining the resultant mixture.

2. The method of claim 1 further characterized in that said acid is selected from the group consisting of thiomalic acid, thioglycolic acid, methanethiolic acid, ethanethiolic acid, propanethiolic acid, methanethionic acid, ethanethionic acid, propanethionic acid, ethanedithioic acid, propanedithioic acid, mercaptoacetic acid, 3-mercaptopropionic acid, 2-mercaptosuccinic acid, and carboxymethylmercaptosuccinic acid.

3. The method of claim 1 further characterized in that said mixture is calcined at a temperature of from about 315° to about 925°C.

4. The method of claim 1 further characterized in that said acid is a mercaptocarboxylic acid.

5. The method of claim 1 further characterized in that said acid is thiomalic acid.

6. The method of claim 1 further characterized in that said acid is thioglycolic acid.

7. The method of claim 1 further characterized in that said acid is mercaptopropionic acid.

8. The method of claim 1 further characterized in that said acid is carboxymethylmercaptosuccinic acid.

9. The method of claim 1 further characterized in that said carrier material comprises alumina.

10. The method of claim 1 further characterized in that said carrier material is gamma-alumina.

11. The method of claim 1 further characterized in that said carrier material is eta-alumina.

12. The method of claim 1 further characterized in that said precursor compound is a compound of a metal of Group VIII.

13. The method of claim 1 further characterized in that said precursor compound is chloroplatinic acid.

14. The method of claim 1 further characterized in that said precursor compound is nickel chloride.

15. The method of claim 1 further characterized in that said precursor compound is cobalt chloride.

* * * * *